(12) United States Patent
Norman (10) Patent No.: US 12,459,192 B2
(45) Date of Patent: Nov. 4, 2025

(54) SYSTEMS AND METHODS FOR SHAPING A PART

(71) Applicant: The Boeing Company, Chicago, IL (US)

(72) Inventor: Nicholas Allan Norman, Summerville, SC (US)

(73) Assignee: THE BOEING COMPANY, Arlington, VA (US)

( * ) Notice: Subject to any disclaimer, the term of this patent is extended or adjusted under 35 U.S.C. 154(b) by 447 days.

(21) Appl. No.: 18/074,715

(22) Filed: Dec. 5, 2022

(65) Prior Publication Data
US 2024/0181694 A1    Jun. 6, 2024

(51) Int. Cl.
| B29C 53/08 | (2006.01) |
| B21D 53/92 | (2006.01) |
| B29L 31/30 | (2006.01) |

(52) U.S. Cl.
CPC ............ B29C 53/086 (2013.01); B21D 53/92 (2013.01); *B29L 2031/3082* (2013.01)

(58) Field of Classification Search
CPC . B21B 38/02; B21B 38/62; B29L 2031/3082; B29L 2031/3076; B21D 53/92
See application file for complete search history.

(56) References Cited

U.S. PATENT DOCUMENTS

| 9,453,720 B2 | 9/2016 | Hunt et al. |
| 9,927,227 B2 | 3/2018 | Hunt et al. |
| 10,898,937 B2 * | 1/2021 | Turanjanin .......... B29C 53/8041 |
| 2014/0327184 A1 | 11/2014 | Chang et al. |
| 2016/0074926 A1 | 3/2016 | Hunt et al. |
| 2016/0075450 A1 | 3/2016 | Hunt et al. |
| 2016/0076879 A1 | 3/2016 | Hunt et al. |
| 2017/0015440 A1 | 1/2017 | Hunt et al. |

FOREIGN PATENT DOCUMENTS

WO    WO-2013135688 A1 *    9/2013    ............... B21D 1/02

OTHER PUBLICATIONS

Translation of WO-2013135688-A1.*

* cited by examiner

Primary Examiner — Bobby Yeonjin Kim
(74) Attorney, Agent, or Firm — COATS & BENNETT, PLLC (57) ABSTRACT

Methods and devices of shaping a part during a manufacturing process. The devices include a contouring unit that applies a force to one or more contact points of an index section of the part, and a measuring unit that measures a shape of a virtual index section of the part. The methods include applying a force to the index section of the part and shaping the separate the virtual index section of the part. The shaping can shape the virtual index section to a target shape.

20 Claims, 8 Drawing Sheets

SYSTEMS AND METHODS FOR SHAPING A PART

TECHNOLOGICAL FIELD

The present disclosure relates generally to the field of shaping of a part during a manufacturing process and, more specifically, to shaping a part using a virtual tool index.

BACKGROUND

A wide variety of parts can be shaped during a manufacturing process. The shaping process generally includes tooling that applies shaping forces in the form of a nominal shape constraint along an index section. Aspects of the application of the forces, such as the amount, direction, and duration of the forces can be adjusted to shape the part as necessary. Traditional shaping methods have a variety of drawbacks.

The tooling to shape the part includes the application of nominal fixed constraints at discrete points along the part. The actuators are spaced apart along the part and forces are not applied at intermediate sections between the actuators. The part can distort between the constraint points. For relatively large parts, pillowing can occur between the actuators in which the intermediate sections of the part between the actuators distort radially away from or towards a center of the part. For relatively small parts, filleting can occur between the actuators in which the shape of the intermediate sections become straight or moves radially inward or outward. These distortions of the shape are particularly problematic for parts with a closed-formed shape in which the part extends around a central opening (e.g., cylinder).

A poorly shaped part is problematic for its use, particularly when the part is connected to another part in an assembly. For example, an aircraft fuselage can be formed from multiple cylindrical sections that are connected together in a side-by-side configuration. In some instances, gaps can occur between the two parts and require shims to be inserted into the gaps. The shimming process can be time consuming as it is a manual sculpting process and it includes high degrees of accuracy which often require skilled technicians who have experience in the process. Further, the connection of the poorly shaped part to an adjacent part prevents the use of designed fasteners as the fasteners are often not long enough to span the gap or otherwise not effective in connecting the parts together. The parts may require different fasteners that can add to the cost and/or increase manufacturing time due to additional drilling. Further, once the part is completed it may be inferior in some manner, such as by causing increased drag in the final assembly. In one example in which the parts are used on aircraft, large steps are formed on the exterior aerodynamic surfaces that can introduce material erosion risks and add drag weight to the aircraft.

SUMMARY

One aspect is directed to a system to shape a part during a manufacturing process. The system comprises a contouring unit that applies forces to one or more contact points of an index section of the part. A measuring unit measures a physical characteristic of a virtual index section of the part with the virtual index section being spaced away from the one or more contact points of the index section. A control unit is configured to apply the forces to the index section through the contouring unit, determine the physical characteristic of the virtual index section based on an output from the measuring unit, and determine that the forces applied to the one or more contact points of the index section changed the physical characteristic of the virtual index section to a target shape.

In another aspect, the contouring unit comprises actuators with each of the actuators comprising a motor, an extension arm, and a contact member that contacts against the index section at the one or more contact points.

In another aspect, the contouring unit further comprises a frame comprising support members that extend around a periphery of the part to position the actuators at the one or more contact points of the index section.

In another aspect, the measuring unit comprises one or more cameras that capture images of the virtual index section.

In another aspect, the control unit is further configured to update a nominal stiffness model based on a measured change in a shape of the virtual index section due to the force applied to the one or more contact points of the index section with the nominal stiffness model comprising an expected change in the shape of the virtual index section due to the forces on the one or more contact points of the index section.

In another aspect, the control unit is further configured to after the forces are initially applied to the one or more contact points of the index section, determine that the shape of the virtual index section does not match the target shape, and apply different forces to the one or more contact points of the index section to change the shape of the virtual index section to the target shape.

In another aspect, the contouring unit is positioned on a first side of a central opening of the part and the measuring unit is positioned on an opposing second side of the central opening of the part.

One aspect is directed to a system to shape a part during a manufacturing process. The system comprises actuators that are spaced apart at contact points along an index section of the part. Sensors are configured to detect a shape of a virtual index section of the part with each of the index section and the virtual index section being along the part with the virtual index section being spaced away from the contact points of the index section. A control unit is configured to apply forces to the contact points of the index section through the actuators to change a shape of the virtual index section.

In another aspect, the control unit comprises a memory circuit that comprises programming instructions, and a processing circuit that controls the actuators based on the programing instructions.

In another aspect, the programming instructions comprise a nominal stiffness model comprising an expected amount of change of the shape of the virtual index section based on the forces that are applied to the contact points of the index section.

In another aspect, the control unit is further configured to refine the nominal stiffness model based on the shape detected by the sensors in response to the forces applied by the actuators.

In another aspect, the part is a first part and the control unit is further configured to control a shape of a second part as a scaled function of the shape of the first part.

In another aspect, each of the actuators comprises a motor, an extension arm that is movable between an extended position and a retracted position, and a contact member mounted at an end of the extension arm and configured to contact against the contact points of the index section of the part.

In another aspect, the sensors comprise a camera configured to capture images of the shape of the virtual index section and wherein the control unit is configured to determine a change in the shape of the virtual index section based on the images.

One aspect is directed to a method of shaping a part during a manufacturing process. The method comprises: applying forces to one or more contact points at an index section of the part; and changing a physical characteristic of a virtual index section of the part to a target physical characteristic based on just the forces with the virtual index section being spaced away from the contact points of the index section.

In another aspect, applying the forces to the contact points of the index section of the part comprises applying separate forces at a plurality of points that are spaced apart along the index section.

In another aspect, the forces are first forces and the method further comprises: measuring a first change to the virtual index section based on the first forces being applied to the contact points of the index section; after measuring the first change, applying second forces to the index section with the second forces being different than the first forces; and determining that the virtual index section has changed to the target shape after applying the second forces to the index section.

In another aspect, the method further comprises applying the first forces to the contact points of the index section and changing an opening shape of the part that has a closed-form configuration.

In another aspect, the method further comprises preventing additional forces from being applied to the part while changing the shape of the virtual index section of the part.

In another aspect, the method further comprises after applying the forces to the contact points of the index section, comparing the shape of the virtual index section to an expected shape and refining the forces for future shaping processes.

The features, functions and advantages that have been discussed can be achieved independently in various aspects or may be combined in yet other aspects, further details of which can be seen with reference to the following description and the drawings.

DETAILED DESCRIPTION

Figure 1:
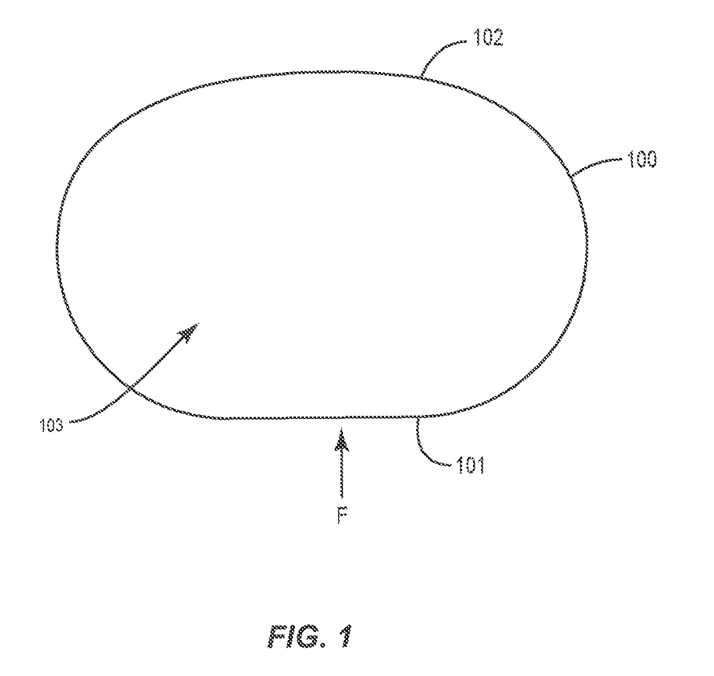
FIG. 1 is a schematic diagram of a force applied to an index section of a part that changes a shape of a virtual index section.

The present application is directed to systems and methods for shaping a part. FIG. 1 illustrates a part 100 that includes an index section 101 and a virtual index section 102. A force F is applied to one or more contact points of the index section 101. The force F causes a change in the shape of the virtual index section 102 that is positioned away from the one or more contact points. Unlike common shaping methods, the one or more contact points of the index section 101 where the force F is applied is not the index for shaping the part 100. Instead, the virtual index section 102 that is spaced away from the one or more contact points forms the index for shaping the part 100.

The shaping methods using the virtual index shaping can be applied to a wide variety of parts 100. In one example, the parts 100 are close-formed with a body that extends around an enclosed opening 103. In one specific example, the part 100 is a section of a fuselage of a commercial aircraft. The part 100 can also include other shapes, such as various open-formed shapes. Examples include but not limited to planar members, and dual-shaped parts with separate planar sections separated by a rounded corner.

The part 100 includes the index section 101 and the virtual index section 102. Each of the index section 101 and the virtual index section 102 are located along the part 100. The contact points of the index section 101 and the virtual index section 102 are separate and spaced apart along the part 100. The sizes, shapes, and relative positioning of the contact points of the index section 101 and the virtual index section 102 can vary depending upon the part 100 and the aspects of the shaping. FIG. 1 includes an example in which the contact points of the index section 101 are positioned on an opposing side of the central opening 103 from the virtual index section 102. In another example, the contact points of the index section 101 are positioned on a same side of the opening 103 as the virtual index section 102. In another example, the contact points of the index section 101 and the virtual index section 102 are adjacent to one another.

Figure 2:
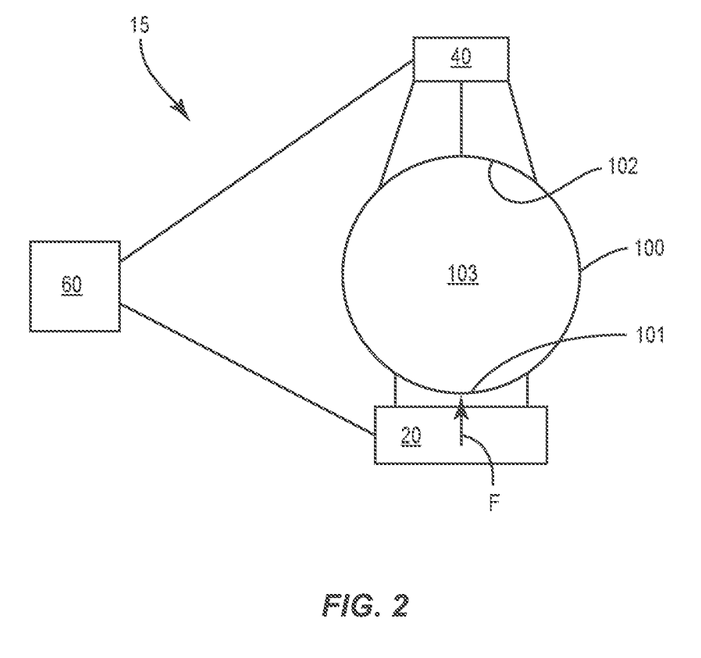
FIG. 2 is a schematic diagram of a system for shaping a part.

FIG. 2 illustrates a system 15 that is configured to shape part 100. A contouring unit 20 is configured to apply one or more forces to the index section 101. The force F applied by the contouring unit 20 to the index section 101 changes the shape of part 100 along the virtual index section 102. A measuring unit 40 measures the change in a physical characteristic of the virtual index section 102. In one example, the physical characteristic is a shape. Additionally or alternatively, the physical characteristic is material strain. A control unit 60 controls the operation of the shaping process. The control unit 60 controls the force F applied by the contouring unit 20 and determines the shape of the virtual index section 102 based on the output from the measuring unit 40.

Figure 3:
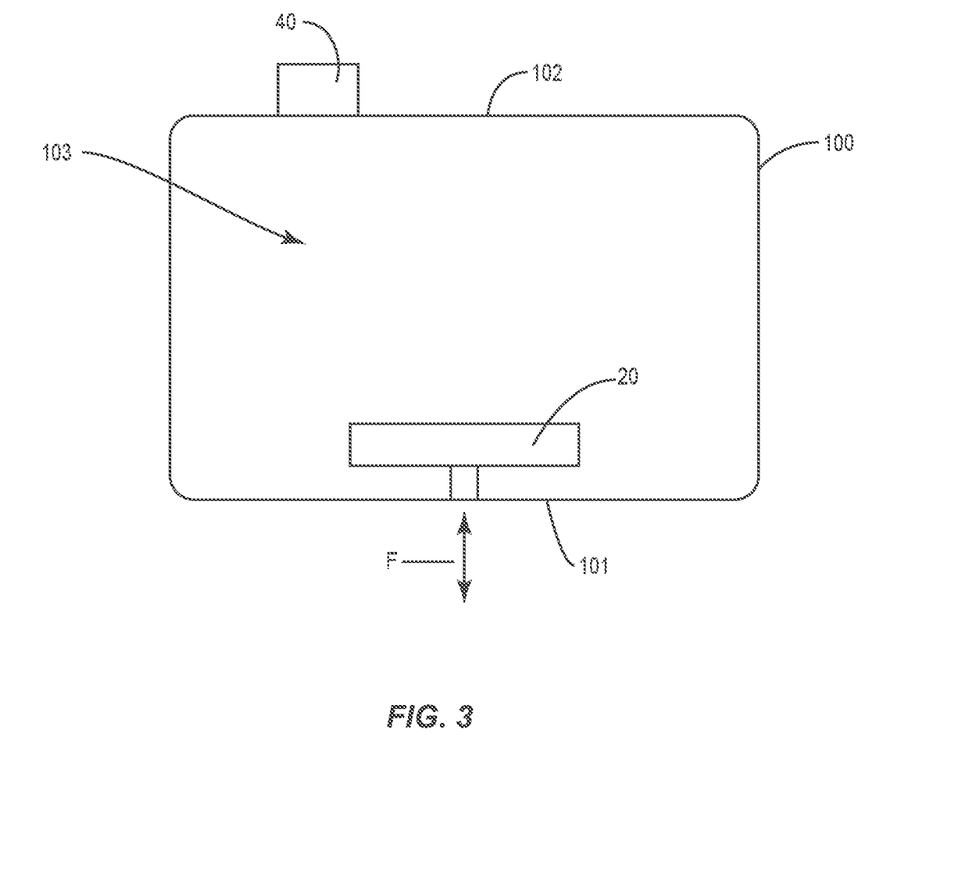
FIG. 3 is a schematic diagram of a contouring unit applying a force to an index section of a part.

The contouring unit 20 applies the force F to the one or more contact points of the index section 101. The force F can be applied at a single point or can be applied at multiple points along the index section 101. Aspects of the force F, such as but not limited to the amount, duration, location, and direction can be adjusted as necessary to shape the virtual index section 102 to a target shape. The contouring unit 20 can be configured to apply the forces either a first side (e.g., an outer side) of the part 100, or on a second side (e.g., an inner side) of the part 100. FIG. 3 is an example in which the contouring unit 20 is sized to fit within the opening 103 and applying a force F against the inner side of the part 100. In this example, the contouring unit 20 is configured to apply a first to a single location on the part 100. The force F can be applied in a first direction (e.g., radially outward) and a second direction (e.g., radially inward).

Figure 4:
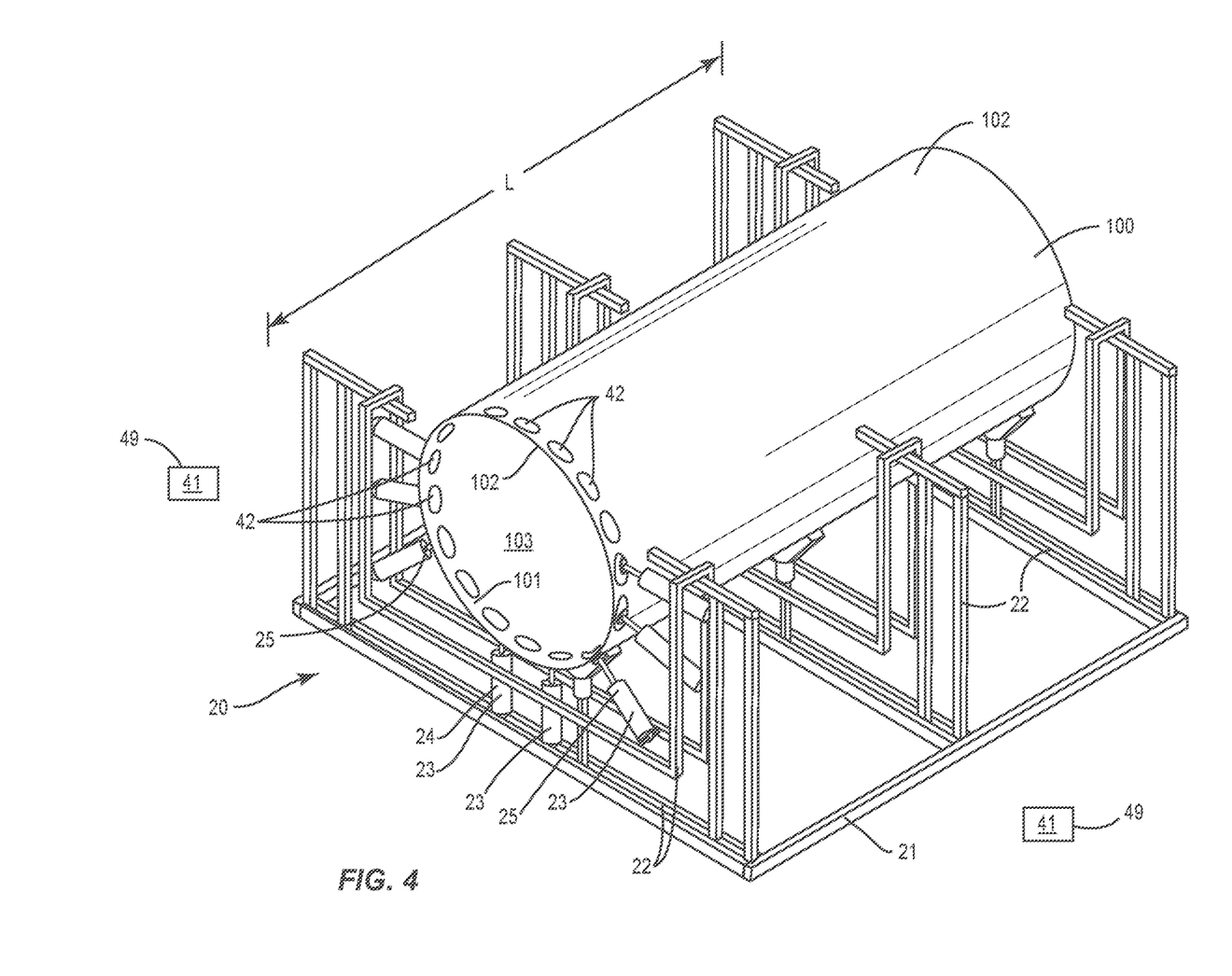
FIG. 4 is a isometric view of a part mounted in a contouring unit 20.

FIG. 4 illustrates an example of a contouring unit 20 positioned on the exterior of the part 100. In this example, the contouring unit 20 includes a frame 21 formed from a series of support members 22 that are connected together and extend along the index section 101 of the part 100. FIG. 4 includes the frame 21 extending around substantially a lower half of the part 100. Actuators 23 are mounted to the frame 21 and positioned to apply forces F at multiple contact points along the index section 101. Each actuator 23 is configured to apply a separate force that accumulate for the overall force F that is applied to shape the part 100. In one example, the actuators 23 are linear actuators that include a motor 24, an arm 25 that is movable between an extended and retracted position, and a contact member 26 at end of the arm 25 that contacts against the part 100. The motor 24 can have various forms including but not limited to electrical, hydraulic, and pneumatic to drive the linear member inward and outward. Activation of the motor 24 causes the arm 25 to be driven inward or outward to apply shaping forces to the part 100. The contact member 26 can be configured to contact against the part 100, or to be connected to the part 100. In one example in which the actuator 23 applies a radially outward force, the contact member 26 is connected to the part 100. In another example, the actuators 23 are configured to apply the force in up to six degrees of freedom. The actuator 23 can apply the force in any one or more of the axes (e.g., up/down, right/left, forward/backward, roll, yaw, pitch). The actuator 23 can further be configured to apply the same force in each axis, or different forces in the different axes. In one example of an actuator 23 with six degrees of freedom, the contact member 26 is a suction cup that attaches to the part 100 and provides for the application of the force in one or more of the directions.

The number and position of the actuators 23 can vary. In one example as illustrated in FIG. 4, the actuators 23 are positioned substantially at one location along the length L. In other examples, the actuators 23 are spaced at multiple locations along the length L. In the various examples, the different actuators 23 can be the same or different and can be configured to apply the same or different forces. The forces can be applied simultaneously or can be applied at different timing constraints as determined by the control unit 60.

The measuring unit 40 measures the physical characteristic of the virtual index section 102. The measuring unit 40 includes one or more sensors 49 to detect the physical characteristic. In one example, the sensor 49 is a camera 41 and targets 42. The camera 41 can be positioned at various locations relative to the part 100 to detect the targets 42 that are positioned on one or both sides of the part 100. The measuring unit 40 can include a single camera 41, or multiple cameras 41 as necessary to capture images of the targets 42. The targets 42 are mounted to one or both sides of the part 100. In one example, the targets 42 are positioned along just the virtual index section 102. In another example, the targets 42 are positioned along both of the index section 101 and the virtual index section 102. The targets 42 are detected by the camera 41 to generate measurements for the current shape of the virtual index section 102. The camera 41 can further be configured to generated measurements for the current shape of the index section 101. In another example, the sensors 49 detect light or soundwaves for testing using shearography.

The measurement unit 40 can also include sensors 49 to detect one or more characteristics of the part 100 at the virtual index section 102. An example includes but is not limited to a strain gauge that detects strain on the part 100 at the virtual index section 102.

The control unit 60 controls the shaping of the part 100. The control unit 60 controls the force F applied by the contouring unit 20 to the contact points of the index section 101 and receives output from the measuring unit 40 to determine the resultant effects on the virtual index section 102. The control unit 60 can use a process with one or more force application-measurement cycles during the shaping of the part 100.

A nominal stiffness model is used by the control unit 60 during the shaping process. The nominal stiffness model is an expected change in the shape of the virtual index section 102 based on the force F applied to the index section 101. The expected changes to the shape can be based on various factors, such as but not limited to the material of the part 100, thickness of the part 100, the shape of the part 100, the size of the part 100, the amount of force F applied, the direction of the applied force F, the number of discrete application points of the force F, and the duration of the applied force F.

The control unit 60 can begin with an initial nominal stiffness model. This model is based on the expected changes as described above. The nominal stiffness model is refined during the process through a feedback loop. The control unit 60 applies an initial force F to the contact points of the index section 101 based on the initial stiffness model. After applying the force F, the control unit 60 measures the resultant change in the shape of the virtual index section 102. The measured results are compared to an expected shape change. The virtual index is then refined based on the difference between the measured and the expected changes. The continuous refinement of the nominal stiffness model provides for a more accurate commanded shape of the part 100. In one example, the control unit 60 includes a database of nominal stiffness models for various part configurations. The feedback loop calibrates the models to refine the process based on the measured results. This results in the virtual index being commanded more accurately.

Figure 5:
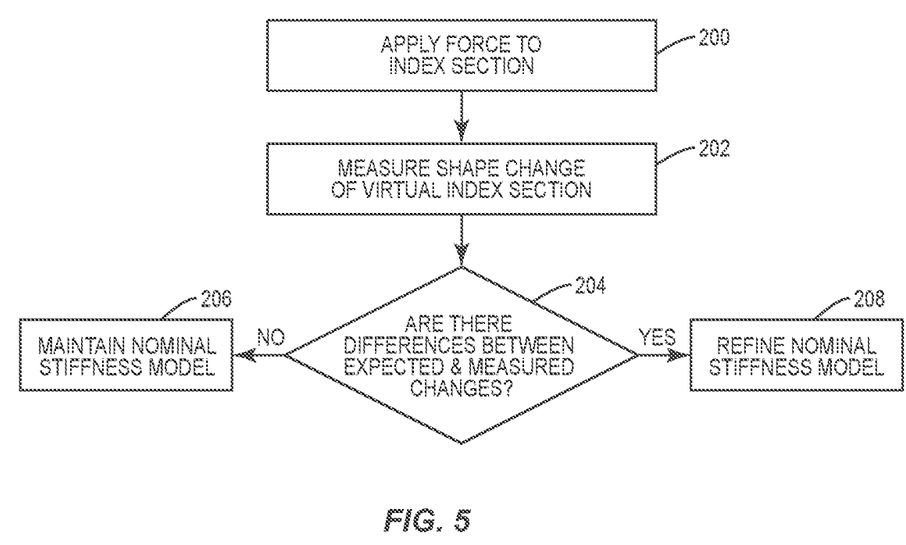
FIG. 5 is a flowchart diagram of a method of shaping a part using a nominal stiffness model.

FIG. 5 illustrates a method of shaping the part 100 using a nominal stiffness model. A force F according to the nominal stiffness model is applied to the contact points of the index section 101 (block 200). The shape of the virtual index section 102 that results from the force F is then measured (block 202). The differences between the expected shape and the measured shape are compared (block 204). If the differences are below a predetermined amount, the nominal stiffness model is maintained (block 206). If the differences are above the predetermined amount, the nominal stiffness model is refined (block 208).

The differences between the expected and measured shapes can be determined in various manners. In one example, a scale factor is used that compares one or more of the shapes corresponding angles lengths of the sides. In another example for a close-formed object, the determination is based on the shape and/or size of the opening 103. In the various examples, a predetermined range can be used and still considered to be the same (e.g., +/−2% difference).

A target shape of the virtual index section 102 is also maintained for use by the control unit 60. Additionally or alternatively, the target shape includes the shape of the entire part 100. The target shape is the desired shape of the finished part after the shaping process. The target shape can include a sectional shape, an overall shape, or the shape of one or more sections of the part 100. The target shape can include various configurations. For example, a target shape of the virtual index section 102 includes an arc that conforms to a circular shape of the overall part 100.

Figure 6:
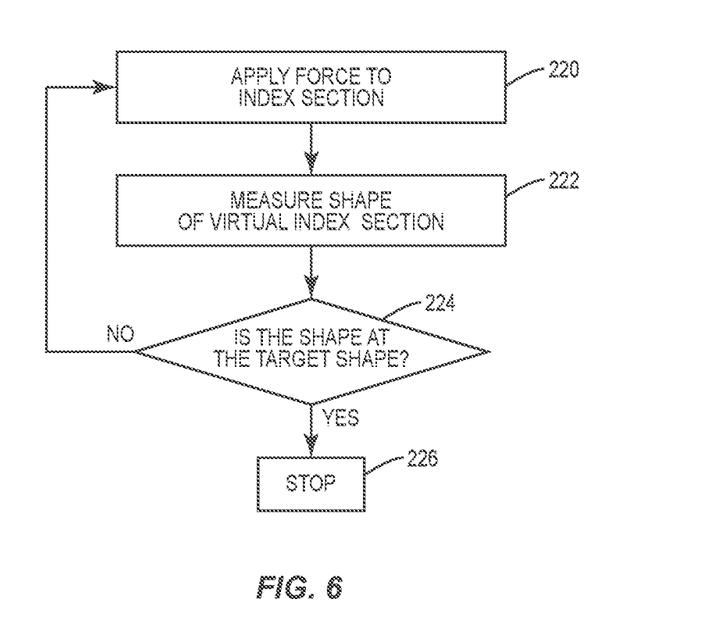
FIG. 6 is a flowchart diagram of a method of shaping a part.

During the shaping process, the target shape is compared to the measured shape. When the two shapes are substantially the same, the process is concluded. When the two shapes are different, the shaping process continues. FIG. 6 illustrates a method of shaping a part 100. The method includes applying a force F to the index section 101 (block 220). The force F can be applied at a single point along the index section 101, or multiple points. The force F results in a change to the shape of the virtual index section 102 which is measured (block 222). The measured shape is compared to the target shape (block 224). If the shapes are different, additional shaping is needed and the process continues with an additional force applied to the index section 101. The additional force can be the same or different force from the initial force that was applied. If the measured shape and the target shape are the same, the process is complete as the desired shape has been obtained by the shaping process (block 226).

The determination of whether the measured shape and the target shape of the virtual index section 102 are the same can vary. Determination measures include but are not limited to a scale factor using one or more measured aspects (e.g., angles, lengths, areas of opening 103). In one example, the shapes are considered equal when they are within a predetermined difference (e.g., +/−2% difference).

In one example, the shaping process can be used to shape one or more sections of the part (e.g., virtual index section 102). In another example, the shaping process is used to shape the entire part 100. In one example, the contouring unit 20 and measuring unit 40 are moved to different positions along the part 100. The shaping process is performed at each position until the entire part 100 has been shaped. In one example, the contouring unit 20 is large enough to extend around the entire part 100.

Figure 7:
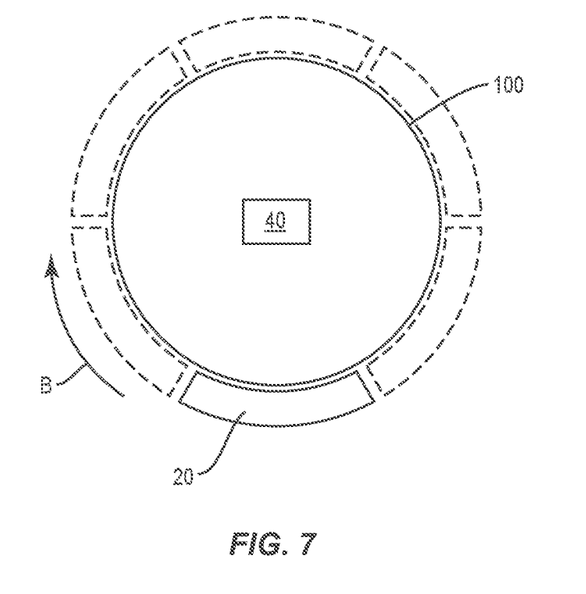
FIG. 7 is a schematic diagram of attachment positions of a contouring unit around a part for multiple discrete shaping steps.

In another example as illustrated in FIG. 7, the contouring unit 20 is smaller and is configured to apply a force to a limited portion of the part 100. In this example, the contouring unit 20 is disconnected and repositioned at multiple positions along the part 100 as illustrated in the dashed positions. At each position, the contouring unit 20 is secured to the part 100 and the shaping force is applied at contact points. The measuring unit 40 measures the resultant change in the shape of the corresponding virtual index section 102. Once positioned, the contouring unit 20 applies a force to the contact points of the section to which is it attached. The process continues for each of the multiple positions until the entire part 100 has been shaped.

Figure 8:
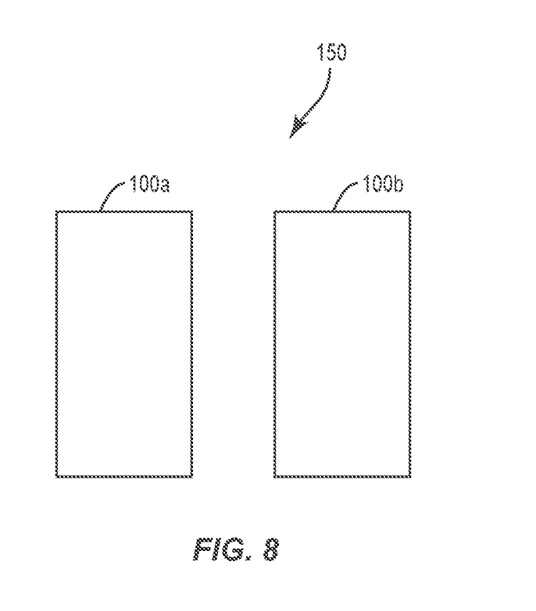
FIG. 8 is a schematic diagram of a first part and a second part configured to be connected together and that were shaped using a shaping process.

The shaping process can be used to shape multiple parts 100 that are connected together to form a larger assembly 150. FIG. 8 illustrates an assembly 150 that include a first part 100*a* and a second part 100*b* that are both shaped using the shaping process. In one example, the first part 100*a* includes a first shape. The second part 100*b* includes a scaled offset of the first shape. The scaled offset is a function of the measured size of the first part 100*a*. The scaled offset of the second part 100*b* reduces steps for connected the two parts 100*a*, 100*b* together. The scaled offset provides for the two parts 100*a*, 100*b* to be connected together in an overlapping manner and further minimizes gaps formed between the parts 100*a*, 100*b*. This can result in the use of smaller fasteners to connect the two parts 100*a*, 100*b*, and quicker drill times.

Figure 9:
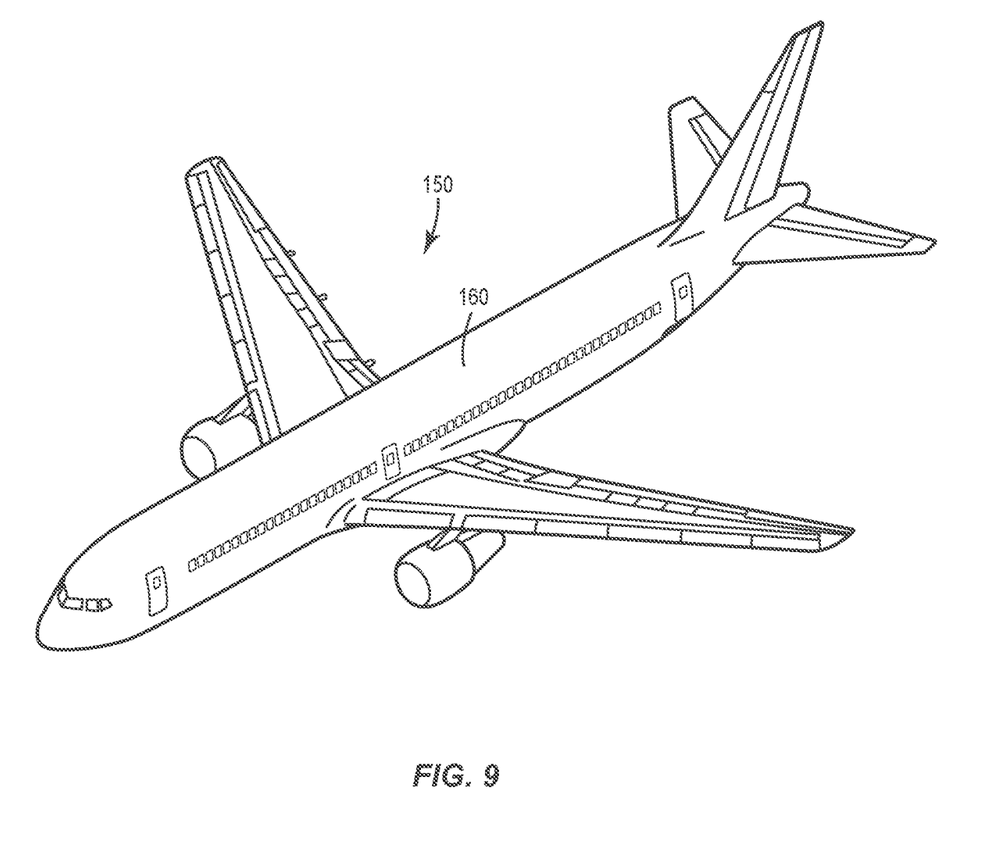
FIG. 9 is an isometric view of an aircraft.

FIG. 9 illustrates an example of an assembly 150 that includes a fuselage 160 constructed from multiple parts 100 that are connected together. The assembly 150 is a commercial aircraft configured to transport persons and/or cargo.

Figure 10:
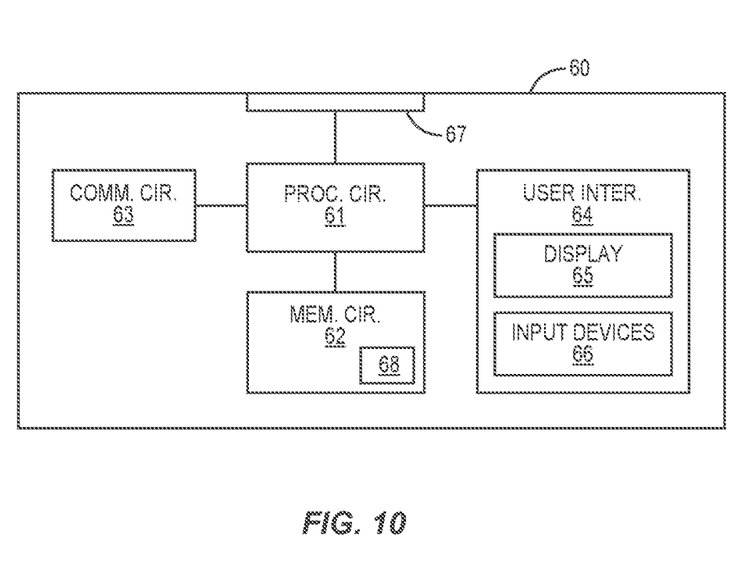
FIG. 10 is a schematic diagram of a control unit.

The control unit 60 controls the shaping process. FIG. 10 illustrates a control unit 60 that includes a processing circuit 61 and a memory circuit 62. The processing circuit 61 controls the various aspects of shaping process according to program instructions 68 stored in the memory circuit 62. The program instructions 68 can further include one or more of the target shapes and the nominal stiffness models. Within examples, the processing circuit 61 includes one or more circuits, microcontrollers, microprocessors, hardware, or a combination thereof. Memory circuit 62 includes a non-transitory computer readable storage medium storing program instructions, such as a computer program product, that configures the processing circuit 61 to implement one or more of the techniques discussed herein. Memory circuit 62 can include various memory devices such as, for example, read-only memory, and flash memory. In one example, memory circuit 62 is a separate component as illustrated in FIG. 10. In another example, memory circuit 62 is incorporated with the processing circuit 61.

Communication circuit 63 provides for communicating with remote components and devices. The communication circuit 63 is configured to provide for one or more of wireless communications and communications through hardwire connections.

A user interface 64 provides for a user to control one or more aspects of the testing. This can include one or more displays 65 for displaying information to the user. The user interface 64 can also include one or more input devices 66 such as but not limited to a keypad, touch screen, touchpad, roller ball, and joystick. The one or more input devices 66 provide for the user to enter commands to the processing circuit 61. An interface 67 is configured to transmit and/or receive signals with one or more of the contouring unit 20 and measuring unit 40.

In one example, the processing circuit 61 receives signals indicative of the aspects detected from the measuring unit 40. The processing circuit 61 performs calculations to determine the results of the shaping. The processing circuit 61 can also be configured to output results to the display 65 and/or a remote device. In another example, the processing circuit 61 outputs the data to a remote computing device that analyzes the data.

The part 100 can be formed from a variety of different materials. In one example, the part 100 is formed from composite material having high-strength reinforcement fibers that are pre-impregnated with a thermoset or a thermoplastic resin. Other examples of materials include but are not limited to various metals and plastics.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system to shape a part during a manufacturing process, the system comprising:
   actuators that are spaced apart at contact points along a first index section of the part;
   sensors configured to detect a shape of a second index section of the part, each of the first index section and the second index section being along the part with the second index section being spaced away from the contact points of the first index section; and
   a control unit configured to apply forces to the contact points of the first index section through the actuators to change a shape of the second index section, the control unit comprising:
   a memory circuit that comprises programming instructions; and
   a processing circuit that controls the actuators based on the programing instructions,
   wherein the programming instructions comprise a nominal stiffness model comprising an expected amount of change of the shape of the second index section based on the forces that are applied to the contact points of the first index section.

2. The system of claim 1, wherein the control unit is further configured to refine the nominal stiffness model based on the shape detected by the sensors in response to the forces applied by the actuators.

3. The system of claim 1, wherein the part is a first part, the control unit further configured to control a shape of a second part as a scaled function of the shape of the first part.

4. The system of claim 1, wherein each of the actuators comprises:
   a motor;
   an extension arm that is movable between an extended position and a retracted position; and
   a contact member mounted at an end of the extension arm and configured to contact against the contact points of the first index section of the part.

5. The system of claim 1, wherein the sensors comprise a camera configured to capture images of the shape of the second index section and wherein the control unit is configured to determine a change in the shape of the second index section based on the images.

6. The system of claim 1, wherein the control unit is further configured to change the shape of the second index section based on a scale factor of a target shape.

7. The system of claim 1, further comprising a frame comprising support members that extend around a periphery of the part to position the actuators at the one or more contact points of the first index section of the part.

8. A system to shape a part during a manufacturing process, the system comprising:
   actuators that are spaced apart at contact points along a first index section of the part;
   sensors configured to detect a shape of a second index section of the part, each of the first index section and the second index section being along the part with the second index section being spaced away from the first index section; and
   a control unit configured to apply forces to the contact points of the first index section through the actuators to change a shape of the second index section, the control unit comprising a processing circuit that controls the actuators based on a nominal stiffness model comprising an expected amount of change of the shape of the second index section based on the forces that are applied to the contact points of the first index section.

9. The system of claim 8, wherein the control unit is further configured to refine the nominal stiffness model based on the shape detected by the sensors in response to the forces applied by the actuators.

10. The system of claim 8, wherein the part is a first part, the control unit further configured to control a shape of a second part as a scaled function of the shape of the first part.

11. The system of claim 8, wherein each of the actuators comprises:
    a motor;
    an extension arm that is movable between an extended position and a retracted position; and
    a contact member mounted at an end of the extension arm and configured to contact against the contact points of the first index section of the part.

12. The system of claim 8, wherein the sensors comprise a camera configured to capture images of the shape of the second index section and wherein the control unit is configured to determine a change in the shape of the second index section based on the images.

13. The system of claim 8, wherein the control unit is further configured to change the shape of the second index section based on a scale factor of a target shape.

14. The system of claim 8, further comprising a frame comprising support members that extend around a periphery of the part to position the actuators at the one or more contact points of the first index section of the part.

15. A system to shape a part during a manufacturing process, the system comprising:
    arms configured to move between an extended position and a retracted position, the arms spaced apart at contact points along a first index section of the part;
    sensors configured to detect a shape of a second index section of the part, each of the first index section and the second index section being along the part with the second index section being spaced away from the contact points of the first index section; and
    a control unit configured to apply forces to the contact points of the first index section through the arms to change a shape of the second index section, the control unit comprising:
    a memory circuit that comprises programming instructions; and
    a processing circuit that controls the arms based on the programing instructions, wherein the programming instructions comprise a nominal stiffness model comprising an expected amount of change of the shape of the second index section based on the forces that are applied to the contact points of the first index section.

16. The system of claim 15, wherein the control unit is further configured to refine the nominal stiffness model based on the shape detected by the sensors in response to the forces applied by the actuators.

17. The system of claim 15, wherein the part is a first part, the control unit further configured to control a shape of a second part as a scaled function of the shape of the first part.

18. The system of claim 15, wherein the sensors comprise a camera configured to capture images of the shape of the second index section and wherein the control unit is configured to determine a change in the shape of the second index section based on the images.

19. The system of claim 15, wherein the control unit is further configured to change the shape of the second index section based on a scale factor of a target shape.

20. The system of claim 15, further comprising a frame comprising support members that extend around a periphery of the part to position the arms at the one or more contact points of the first index section of the part.

* * * * *